United States Patent
Lee et al.

(10) Patent No.: US 6,950,582 B2
(45) Date of Patent: Sep. 27, 2005

(54) BI-DIRECTIONAL OPTICAL TRANSCEIVER MODULE

(75) Inventors: Yu-Sheop Lee, Suwon-shi (KR); Hyun-Ho Ryoo, Suwon-shi (KR); Gi-Tae Mun, Suwon-shi (KR); Young-Kwon Yoon, Anyang-shi (KR)

(73) Assignee: Samsung Electronics Co., LTD, Suwon-si (KR)

( * ) Notice: Subject to any disclaimer, the term of this patent is extended or adjusted under 35 U.S.C. 154(b) by 171 days.

(21) Appl. No.: 10/653,814

(22) Filed: Sep. 3, 2003

(65) Prior Publication Data

US 2004/0247247 A1 Dec. 9, 2004

(30) Foreign Application Priority Data

Jun. 4, 2003 (KR) .................. 10-2003-0036056

(51) Int. Cl.[7] ................................. G20B 6/30
(52) U.S. Cl. .................. 385/49; 385/45; 385/47
(58) Field of Search ................. 385/14, 41–49

(56) References Cited

U.S. PATENT DOCUMENTS 5,825,951 A * 10/1998 Kitamura ..................... 385/45
6,480,647 B1 * 11/2002 Kitamura ................. 385/45 X

* cited by examiner

Primary Examiner—Phan T. H. Palmer
(74) Attorney, Agent, or Firm—Cha & Reiter, L.L.C.

(57) ABSTRACT

In a bi-directional optical transceiver module, a first waveguide transmits a optical signal received from a light source to a high reflection layer formed on a waveguide substrate. A second waveguide extends from the optical fiber to the high reflection layer. With a first mode coupling region formed by ends of the first and second waveguides near the high reflection layer, the second waveguide transmits the transmission optical signal mode-coupled from the first waveguide to the optical fiber and receives the reception optical signal from the optical fiber. A third waveguide extends from the optical detector to near an end of the optical fiber. With a second mode coupling region formed by an end of the third waveguide and the other end of the second waveguide, the third waveguide transmits the reception optical signal mode-coupled from the second waveguide to the optical detector.

20 Claims, 9 Drawing Sheets

BI-DIRECTIONAL OPTICAL TRANSCEIVER MODULE

CLAIM OF PRIORITY

This application claims priority under 35 U.S.C. § 119 to an application entitled "Bi-directional Optical Transceiver Module," filed in the Korean Intellectual Property Office on Jun. 4, 2003 and assigned Ser. No. 2003-36056, the contents of which are herein incorporated by reference.

BACKGROUND OF THE INVENTION

1. Field of the Invention

The present invention relates generally to a transceiver module, and in particular, to a bi-directional optical transceiver module of a planar optical waveguide type for bi-directional optical transmission and reception.

2. Description of the Related Art

A typical bi-directional optical communication system includes a light source for converting an electrical signal to an optical signal and an optical detector for detecting an external input optical signal. However, the bi-directional optical communication system is not effective in terms of cost and size as the light source and the optical detector are separately constituted. Integrating a light source and an optical detector within a bi-directional optical transceiver module has become common as a consequence of the recent development and proliferation of optical communication systems that can perform bi-directional optical communication through a single optical fiber. A substrate may be implemented, for example, by hybrid-integrating a light source and an optical detector on the substrate along with planar waveguides.

Figure 1:
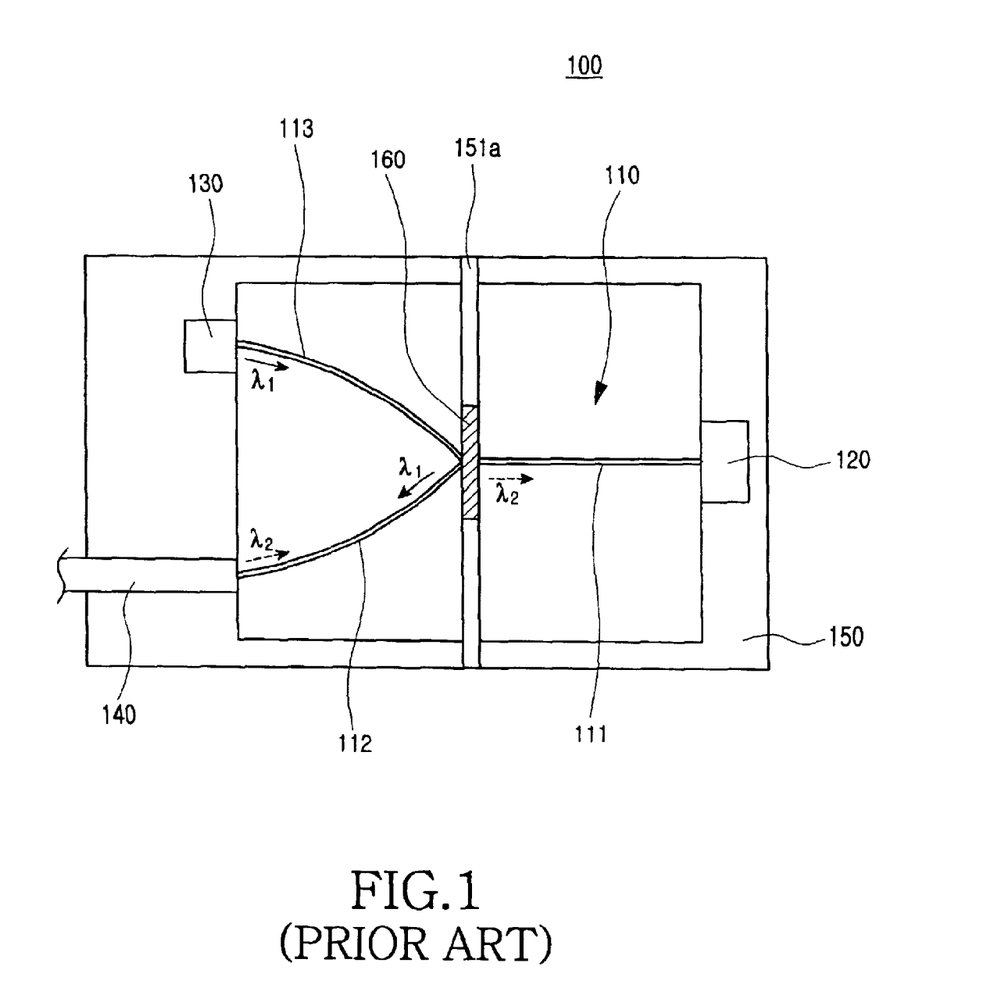
FIG. 1 illustrates a conventional bi-directional optical transceiver module having a 2-branch optical waveguide.

FIG. 1 illustrates a conventional bi-directional optical transceiver module having an optical waveguide divided into two branch waveguides and a directional coupler. The module 100 includes a 2-branch waveguide 110, a multilayer thin-film filter 160, a light source 130 for outputting a transmission optical signal λ1, an optical fiber 140 serving as an input/output medium for the transmission optical signal λ1 and a reception optical signal λ2, an optical detector 120 for detecting the reception optical signal λ2, and a waveguide substrate 150.

A lower clad layer (not shown), a core layer (not shown), and an upper clad layer (not shown) have sequentially been deposited on the upper surface of the waveguide substrate 150, to thereby form the 2-branch waveguide 110. The optical fiber 140, the light source 130, and the optical detector 120 are mounted on the waveguide substrate 150.

A non-branched end 111 of the 2-branch waveguide 110 is connected to the optical detector 120, while one branched end 113 of the waveguide 110 is connected to the light source 130 and the other branched end 112, to the optical fiber 140. The multilayer thin-film filter 160 is secured in a groove 151a formed into the upper surface of the waveguide substrate 150, so that it is positioned at the center of the 2-branch waveguide 110.

The multilayer thin-film filter 160 reflects the transmission optical signal λ1 received through the branched waveguide end 113 connected to the light source 130 to the other branched waveguide end 112, and passes the reception optical signal λ2 received from the branched waveguide end 112 to the non-branched waveguide end 111 connected to the optical detector 120.

The conventional bi-directional optical transceiver module suffers great loss in light intensity if the position of the multilayer thin-film filter is less than precisely aligned. Therefore, either the need for precise alignment means for the multilayer thin-film filter increases product cost or light intensity loss reduces the reception sensitivity of the optical detector.

An example of a bi-directional optical transceiver module having a multilayer thin-film filter is found in U.S. Pat. No. 6,480,647 entitled "Waveguide Type Wavelength Multiplexing Optical Transmitter/Receiver Module" to Naoki Kitamura et al ("the '647 patent"). The bi-directional optical transceiver module in the '647 patent minimizes intensity loss of transmission and reception optical signals by use of a multilayer thin-film filter mounted on the upper surface of a waveguide substrate and waveguides that form optical paths connected to the multilayer thin-film filter.

However, this bi-directional optical transceiver module requires means for aligning and supporting the optical detector and the waveguide substrate, thereby increasing product cost.

An exemplary bi-direction optical transceiver module with a 2-branch optical waveguide and a non-branched optical waveguide is disclosed in U.S. Pat. No. 5,825,951 entitled "Optical Transmitter-Receiver Module" to Naoki Kitamura et. al. ("the '951 patent"). A reception optical signal input to a non-branched end of the 2-branch waveguide is branched and then transmitted to an optical detector. A transmission optical signal input to the turning optical waveguide is mode-coupled to a branched end of the 2-branch waveguide and transmitted through an optical fiber.

A shortcoming of this bi-directional optical transceiver module, however, is great loss in the intensity of transmission and reception optical signals due to the use of the 2-branch waveguide.

SUMMARY OF THE INVENTION

In one aspect, the present invention provides a bi-directional optical transceiver module that can be easily fabricated with low product cost and that minimizes the loss of light intensity.

In a bi-directional optical transceiver module, a light source outputs a transmission optical signal, an optical detector detects a reception optical signal, and an optical fiber acts as an input and output medium for the transmission and reception optical signals. The optical fiber, the light source, and the optical detector are mounted on a waveguide substrate. A high reflection layer is formed in a portion of the waveguide substrate, for reflecting the transmission optical signal. A first waveguide having a first layer end at the high reflection layer, and extending from the light source to the first layer end, transmits the transmission optical signal received from the light source to the high reflection layer. A second waveguide having a first fiber end and a second layer end at the high reflection layer extends at the first fiber end from the optical fiber to the second layer end. The second layer end forms a first mode coupling region together with the first layer end. Thus, the second waveguide transmits the transmission optical signal mode-coupled from the first waveguide to the optical fiber and receives the reception optical signal from the optical fiber. A third waveguide has a second fiber end at the optical fiber and extends from the second fiber end. The second fiber end forms a second mode coupling region together with the first fiber end. Thus, the third waveguide transmits the reception optical signal mode-coupled from the second waveguide to the optical detector.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. The following description omits detailed description of well-known functions or constructions to avoid obscuring the invention in unnecessary detail.

Figure 2:
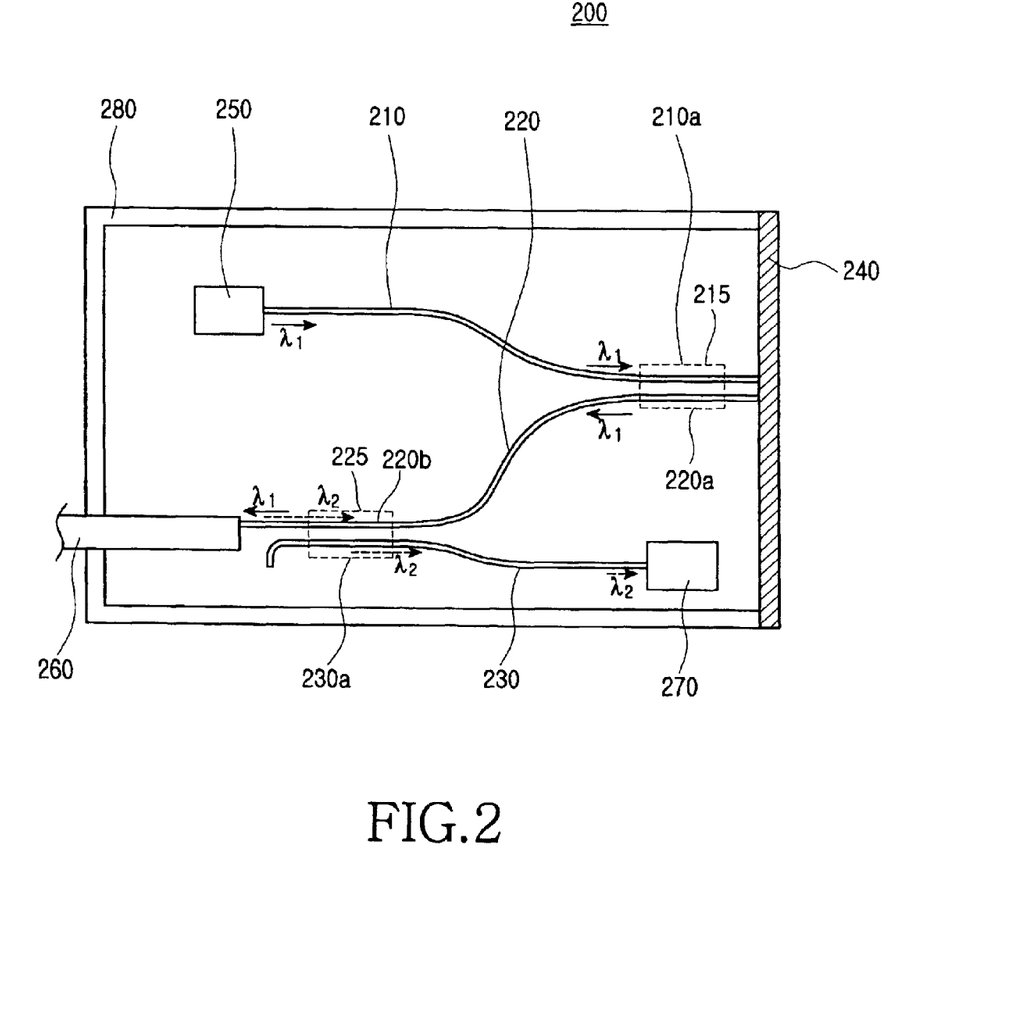
FIG. 2 illustrates a bi-directional optical transceiver module including first and second mode coupling regions of a directional coupler type and a high reflection layer according to an embodiment of the present invention.

FIG. 2 illustrates a bi-directional optical transceiver module having first and second mode coupling regions of a directional coupler type and a high reflection layer according to an embodiment of the present invention. The module 200 includes an optical fiber 260, a light source 250, an optical detector 270, a waveguide substrate 280 with a high reflection layer 240 formed in a portion thereof for reflecting a transmission optical signal $\lambda 1$, a first waveguide 210, a second waveguide 220 for transmitting the transmission optical signal mode-coupled from the first waveguide 210 to the optical fiber 260 and transmitting a reception optical signal $\lambda 2$, and a third waveguide 230 for transmitting the reception optical signal $\lambda 2$ to the optical detector 270.

The waveguide substrate 280 can be formed of polymer such as fluorinated polyimide, or silica. It also has a groove (not shown) on its upper surface, for receiving the optical fiber 260 therein. To form the first, second and third waveguides 210, 220, 230, a lower clad layer (not shown), a core layer (not shown), and an upper clad layer (not shown) have sequentially been deposited on the waveguide substrate 280. The light source 250 and the optical detector 270 are mounted on the waveguide substrate 280.

The high reflection layer 240 can be formed in a portion of the waveguide substrate 280 by bonding or deposition. It reflects the transmission optical signal $\lambda 1$ received from the first waveguide 210 to the second waveguide 220.

The optical fiber 260 is mounted in the groove of the waveguide substrate 280 and its end is connected to the second waveguide 211. The optical fiber 260 outputs the transmission optical signal $\lambda 1$ generated from the light source 250 inside the bi-directional optical transceiver module 200, and inputs the reception optical signal $\lambda 2$ generated from outside the module 200.

The light source 250 is installed on the waveguide substrate 280 by flip chip bonding and connected to the first waveguide 210, for outputting the transmission optical signal $\lambda 1$ to the first waveguide 210. A Fabry-Perot laser diode or a distributed feedback laser diode can be used as the light source 250.

The optical detector 270, connected to the third waveguide 230, detects the optical signal $\lambda 2$ received from the third waveguide. It is installed on the waveguide substrate by flip chip bonding.

The first waveguide 210 extends from the light source 250 to the high reflection layer 240 and transfers the transmission optical signal $\lambda 1$ emitted from the light source 250 to the high reflection layer 240.

An end 220a of the second waveguide 220 extending from the optical fiber 260 to the high reflection layer 240 forms a first mode coupling region 215 together with an end 210a of the first waveguide 210.

The first mode coupling region 215 is of a directional coupler type. It couples the transmission optical signal $\lambda 1$ from the first waveguide 210 to the second waveguide 220. The intensity of the transmission optical signal $\lambda 1$ mode-coupled in the first mode coupling region 215 can be controlled by adjusting the lengths of the first waveguide end 210a and the second waveguide end 220a and the gap between them.

The third waveguide 230, extending from the optical detector 270 to near the optical fiber 260, transmits the reception optical signal $\lambda 2$ to the optical detector. Its end 230a near the optical fiber 260 forms a second mode coupling region 225 together with the other end 220b of the second waveguide 220.

The second mode coupling region 225 is of a directional coupler type. It mode-couples the reception optical signal $\lambda 2$ from the second waveguide 220 to the third waveguide 230 and transfers the transmission optical signal $\lambda 1$ input to the second waveguide to the optical fiber 260. The intensities of the transmission and reception optical signals $\lambda 1$ and $\lambda 2$ mode-coupled in the second mode coupling region 225 can be controlled by adjusting the lengths of the second waveguide end 220b and the third waveguide end 230a and the gap between them.

Figure 3:
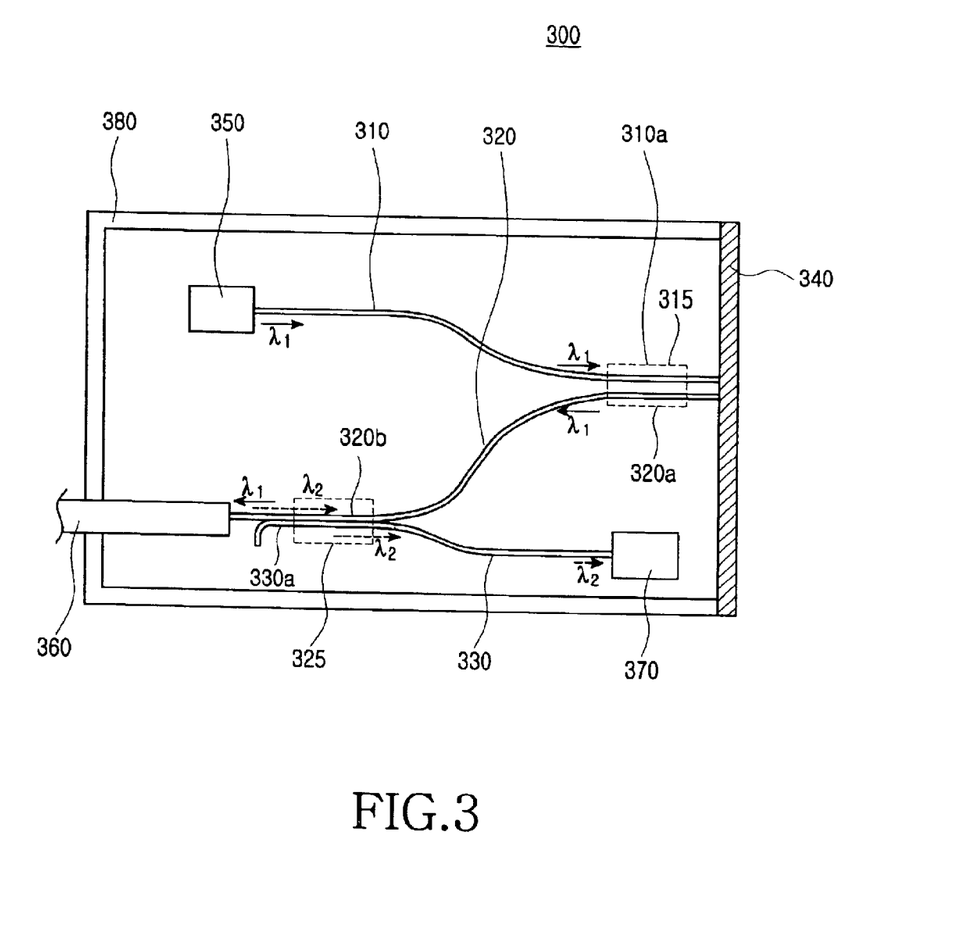
FIG. 3 illustrates a bi-directional optical transceiver module including a mode coupling region of a directional coupler type, a multimode interferometer, and a high reflection layer according to another embodiment of the present invention.

FIG. 3 illustrates a bi-directional optical transceiver module having a mode coupling region of a directional coupler type, a multimode interferometer, and a high reflection layer according to another embodiment of the present invention. The module 300 includes a light source 350 for outputting a transmission optical signal at a wavelength of 1310 nm, a waveguide substrate 380 having a high reflection layer 340 formed thereon, and first, second and third waveguides 310, 320, 330. Ends 310a, 320a of the first and second waveguides 310, 320 form a mode coupling region 315, and connection between ends 320b, 330a of the second and third waveguides 320, 330 forms a multimode interferometer 325.

The light source 350, connected to the first waveguide 310, outputs the 1310 nm transmission optical signal λ1 to the first waveguide 310, and may be a Fabry-Perot laser diode or a distributed feedback laser diode.

The optical fiber 360, connected to the second waveguide 320, transfers a 1490 nm reception optical signal λ2 to the bi-directional optical transceiver module 300 and outputs the 1310 nm transmission optical signal λ1 emitted from the light source 350 outside the bi-directional optical transceiver module 300.

The optical detector 370, connected to the third waveguide 330, detects the 1490 nm reception optical signal λ2 received from the optical fiber 360. A photodiode can be used as the optical detector 370.

The mode coupling region 315 is of a directional coupler type having a length of 775 $\mu$m. Here, the diameter of the first and second waveguides 310, 320 is 7 $\mu$m and the gap between the waveguide ends 310a 320a is 2.5 $\mu$m. The mode coupling region 315 mode-couples the 1310 nm transmission optical signal λ1 from the first waveguide 310 to the second waveguide 320.

Figure 4:
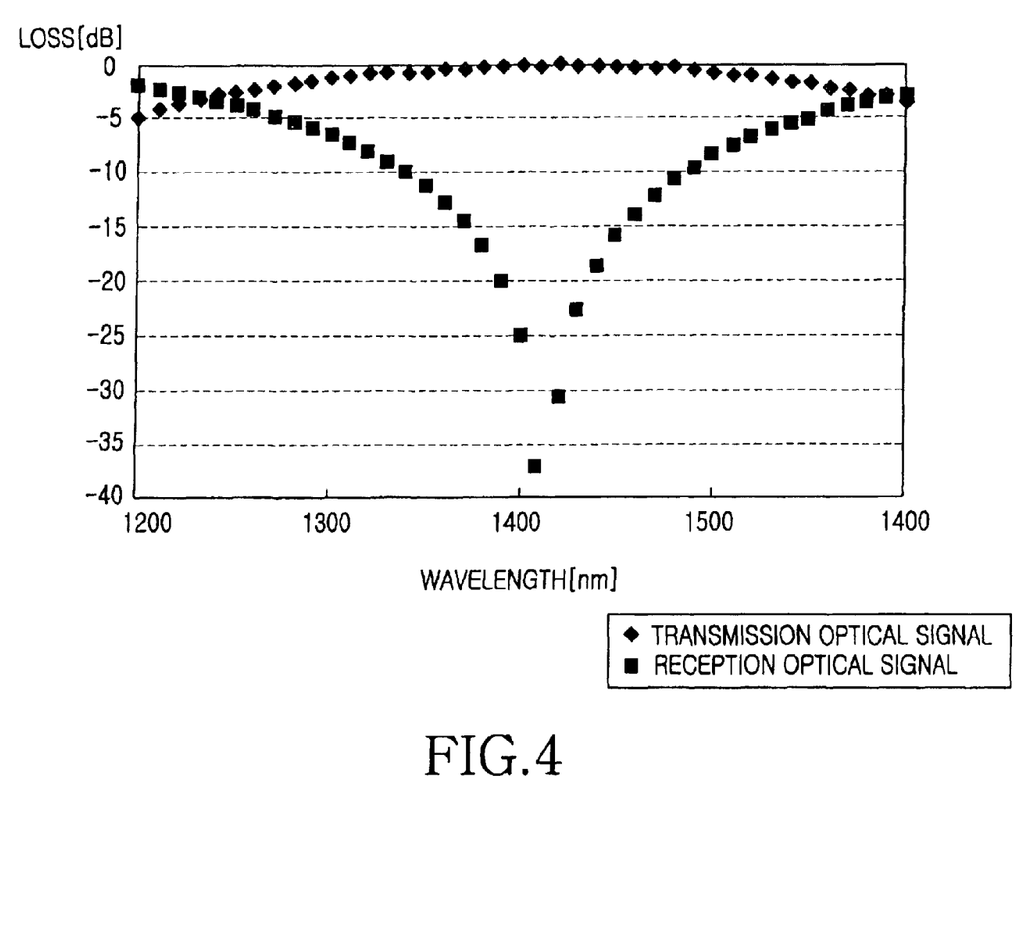
FIG. 4 is a graph illustrating the loss characteristics of a 1310 nm transmission optical signal in the mode coupling regions of a directional coupler type illustrated in FIGS. 2 and 3.

FIG. 4 is a graph illustrating the loss characteristics of the 1310 nm transmission optical signal in the mode coupling regions of a directional coupler of the type illustrated in FIGS. 2 and 3. As noted from FIG. 4, the transmission optical signal is mode-coupled with a 0.2 dB or less of loss from the first waveguide 210, 310 to the second waveguide 220, 320 in the mode coupling region 215, 315.

Returning to FIG. 3, the third waveguide 330 extends from the optical detector 370 to near the optical fiber 360. Its end 330a near the optical fiber is connected to the second waveguide end 320b, forming the multimode interferometer 325. The third waveguide 330 transmits the reception optical signal λ2 in the multimode interferometer 325 to the optical detector 370.

The multimode interferometer 325 transfers the transmission optical signal λ1 input to the second waveguide 320 to the optical fiber 360, and couples the reception optical signal λ2 from the second waveguide 320 to the third waveguide 330.

Figure 5:
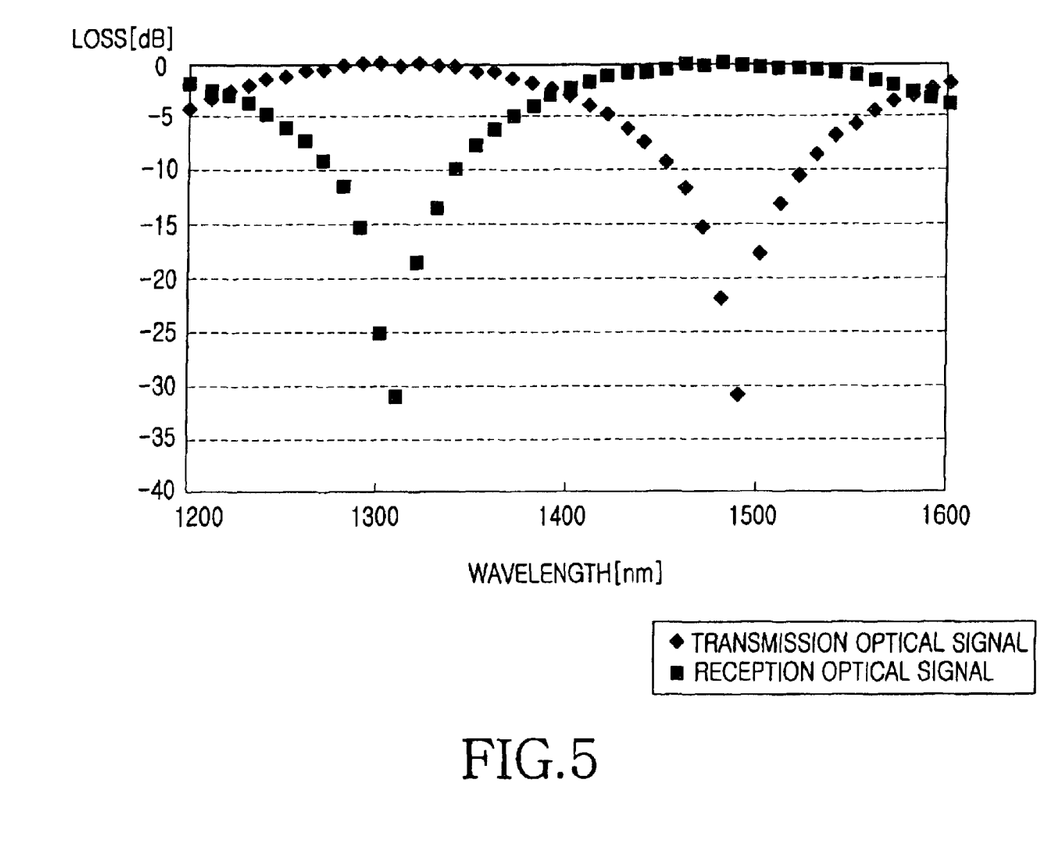
FIG. 5 is a graph illustrating the loss characteristics of a 1310 nm transmission optical signal and a 1490 nm reception optical signal in the second mode coupling region of a directional coupler type illustrated in FIG. 2.
Figure 6:
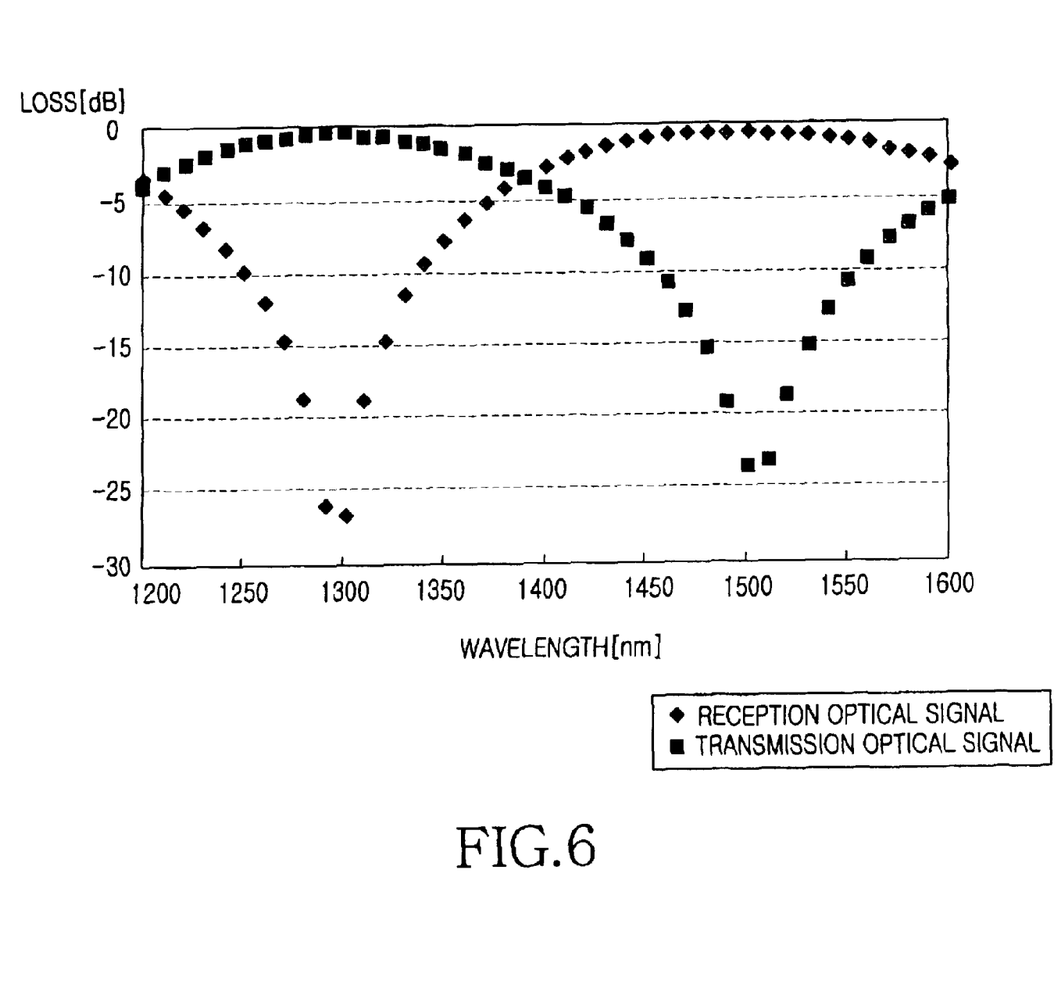
FIG. 6 is a graph illustrating the loss characteristics of a 1310 nm transmission optical signal and a 1490 nm reception optical signal in the multimode interferometer illustrated in FIG. 3.

FIG. 5 is a graph illustrating the loss characteristics of the 1310 nm transmission optical signal and the 1490 nm reception optical signal in the second mode coupling region of a directional coupler type illustrated in FIG. 2, and FIG. 6 is a graph illustrating the loss characteristics of the 1310 nm transmission optical signal and the 1490 nm reception optical signal in the multimode interferometer illustrated in FIG. 3.

As FIG. 5 shows, the 1310 nm transmission optical signal and the 1490 nm reception optical signal experience a 0.2 dB or less of intensity loss in the second mode coupling region 230. Referring to FIG. 6, the 1310 nm transmission optical signal experiences a 0.2 dB or less of intensity loss, and the 1490 nm reception optical signal experiences approximately 0.2 dB of intensity loss.

Figure 7:
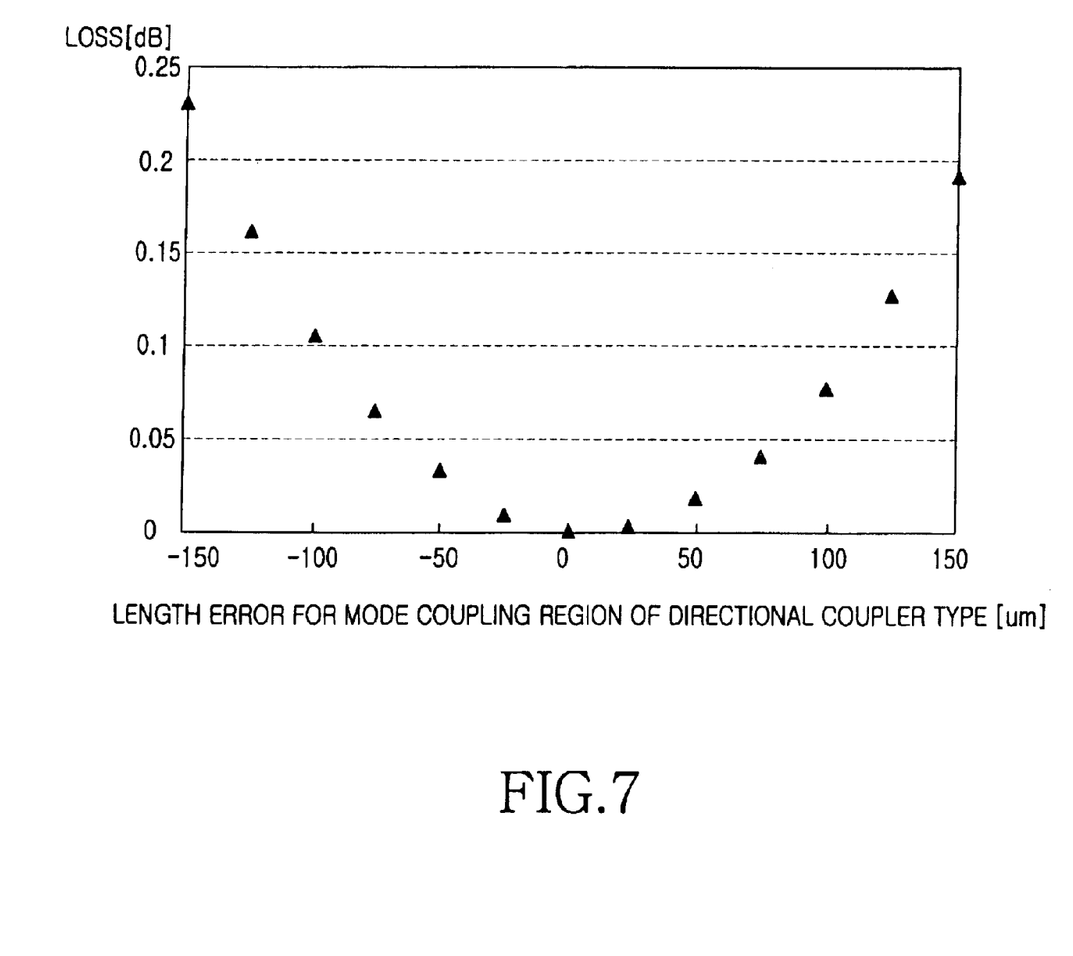
FIG. 7 is a graph illustrating the loss characteristics of a transmission/reception optical signal with respect to the lengths of the mode coupling regions of a directional coupler type illustrated in FIGS. 2 and 3.
Figure 8:
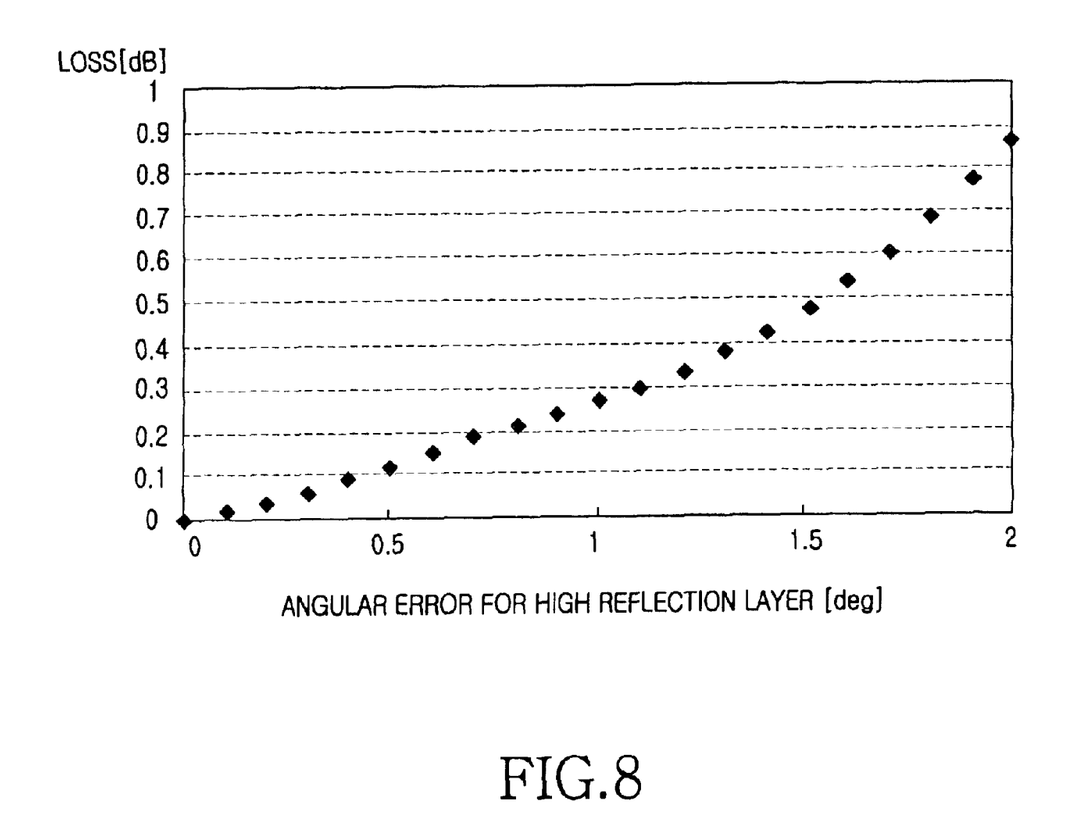
FIG. 8 is a graph illustrating the loss characteristics of a transmission/reception optical signal with respect to changes in the inclination of the high reflection layer illustrated in FIG. 3.

FIG. 7 is a graph illustrating the loss characteristics of a transmission/reception optical signal with respect to the lengths of the mode coupling regions of a directional coupler of the type illustrated in FIGS. 2 and 3, and FIG. 8 is a graph illustrating the loss characteristics of a transmission/reception optical signal with respect to changes in the inclination of the high reflection layer illustrated in FIG. 3. The graphs of FIG. 5 assume that the first and second mode coupling regions 215, 225 are 775$\mu$m and 4,650 $\mu$m in length, respectively, the diameter of the first, second and third waveguides 210, 220, 230 is 7 $\mu$m, and the gap between the first and second waveguides 210, 220 and between the second and third waveguides 220, 230 is 2.5 $\mu$m.

As demonstrated in FIG. 7, an error of ±50 $\mu$m in the lengths of the first and second mode coupling regions 215, 225 increases the light intensity loss by 0.05 dB or less. If the length error is ±100 $\mu$m, the light intensity loss increase is 0.1 dB or less.

FIG. 8 shows that if the inclination of the high reflection layer is 0.5 degrees, the intensity loss of the transmission/reception optical signal is increased by 0.1 dB. An allowable inclination error for the high reflection layers 240, 340 of the bi-directional optical transceiver modules 200, 300 is up to 0.5 degrees, whereas an allowable length error for the first and second mode coupling regions 215, 225 of a directional coupler type is up to 100 $\mu$m.

Figure 9:
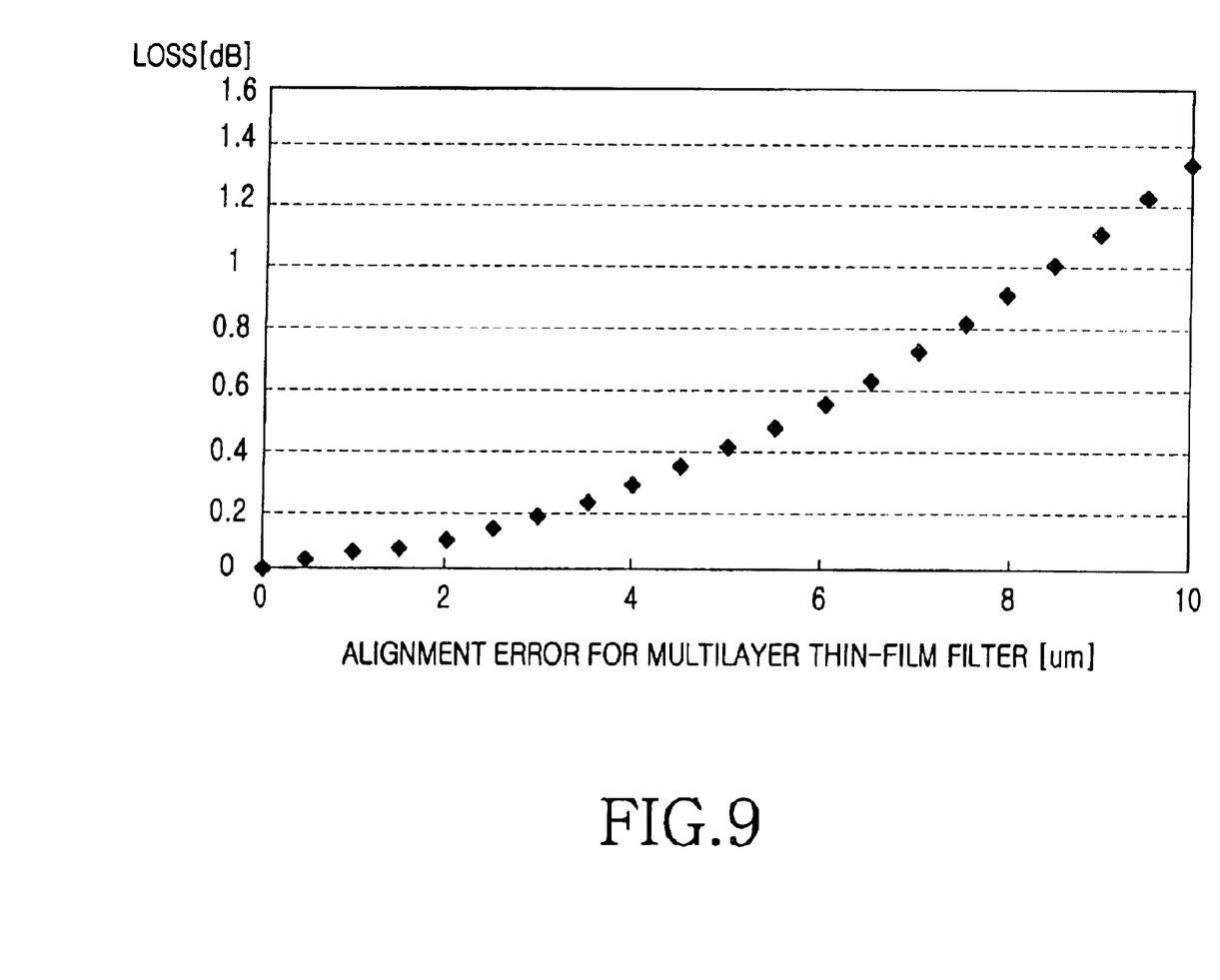
FIG. 9 is a graph illustrating the loss characteristics of a transmission/reception optical signal with respect to alignment errors of the conventional multilayer thin-film filter illustrated in FIG. 1.

FIG. 9 is a graph illustrating the loss characteristics of a transmission/reception optical signal with respect to alignment errors of the conventional multilayer thin-film filter illustrated in FIG. 1. An alignment error of 2 $\mu$m for the multilayer thin-film filter causes a 0.2 dB intensity loss in the transmission/reception optical signal. If the alignment error is 6 $\mu$m, the intensity loss is about 0.6 dB.

As has been demonstrated above, the bi-directional optical transceiver modules of the present invention allow a wider error range than the conventional one. The resulting easy processing and optical axis alignment increase product yield and reduce manufacturing cost.

In the bi-directional optical transceiver modules according to the present invention, a mode coupling region is formed by non-branched waveguides, and thus a reception/transmission optical signal is not branched in the mode coupling region. As a result, branch-causing light intensity loss is prevented. Furthermore, formation of a high reflection layer on a portion of a waveguide substrate including waveguides minimizes light intensity loss and facilitates the bi-directional optical transceiver module.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bi-directional optical transceiver module comprising:
   a light source for outputting a transmission optical signal;
   an optical detector for detecting a reception optical signal;
   an optical fiber being an input and output medium for the transmission and reception optical signals;
   a waveguide substrate on which the optical fiber, the light source, and the optical detector are mounted, and in a portion of which is formed a high reflection layer for reflecting the transmission optical signal;
   a first waveguide having a first layer end at the high reflection layer and extending from the light source to the first layer end, for transmitting the transmission optical signal received from the light source to the high reflection layer;
   a second waveguide having a first fiber end and a second layer end at the high reflection layer and extending at the first fiber end from the optical fiber to the second layer end which forms a first mode coupling region together with the first layer end, for transmitting the transmission optical signal mode-coupled from the first waveguide to the optical fiber and receiving the reception optical signal from the optical fiber; and a third waveguide having a second fiber end at the optical fiber and extending from the optical detector to the second fiber end which forms a second mode coupling region together with the first fiber end, for transmitting the reception optical signal mode-coupled from the second waveguide to the optical detector.

2. The bi-directional optical transceiver module of claim 1, the coupling regions being configured to couple optical signals so as to experience an increase of 0.1 dB or less in light intensity loss as a result of a length error of 100 μm or less for one of the first and second mode coupling regions.

3. The bi-directional optical transceiver module of claim 2, wherein the first and second layer ends are disposed apart from each other by a predetermined gap.

4. The bi-directional optical transceiver module of claim 2, wherein the first and second fiber ends are disposed apart from each other by a predetermined gap.

5. The bi-directional optical transceiver module of claim 1, wherein the waveguide substrate is formed of fluorinated polyimide.

6. The bi-directional optical transceiver module of claim 1, wherein the mounting occurs on an upper surface of the waveguide substrate, the high reflection layer having an inclination of 0.5 or less degrees with respect to a normal line perpendicular to said upper surface.

7. The bi-directional optical transceiver module of claim 1, wherein the first mode coupling region forms a directional coupler with the first and second layer ends apart from each other by a predetermined gap.

8. The bi-directional optical transceiver module of claim 1, wherein the second mode coupling region forms a directional coupler with the first and second fiber ends apart from each other.

9. The bi-directional optical transceiver module of claim 1, wherein the waveguide substrate is formed of silica.

10. The bi-directional optical transceiver module of claim 1, wherein the light source includes a Fabry-Perot laser.

11. The bi-directional optical transceiver module of claim 1, wherein the light source includes a distributed feedback laser.

12. The bi-directional optical transceiver module of claim 1, wherein the optical detector includes a photodiode of a planar waveguide type.

13. A bi-directional optical transceiver module comprising:

a light source for outputting a transmission optical signal;

an optical detector for detecting a reception optical signal;

an optical fiber being an input and output medium for the transmission and reception optical signals;

a waveguide substrate on which the optical fiber, the light source, and the optical detector are mounted, and in a portion of which is formed a high reflection layer for reflecting the transmission optical signal;

a first waveguide having a first layer end at the high reflection layer and extending from the light source to the first layer end, for transmitting the transmission optical signal received from the light source to the high reflection layer;

a second waveguide having a first fiber end and a second layer end at the high reflection layer and extending at the first fiber end from the optical fiber to the second layer end which forms a mode coupling region together with the first layer end, for transmitting the transmission optical signal mode-coupled from the first waveguide to the optical fiber and receiving the reception optical signal from the optical fiber; and a third waveguide having a second fiber end at the optical fiber and extending from the optical detector to the second fiber end which is connected to the first fiber end to form a multimode interferometer, for transmitting the reception optical signal coupled from the second waveguide to the optical detector.

14. The bi-directional optical transceiver module of claim 13, wherein the mode coupling region forms a directional coupler with the first and second layer ends apart from each other by a predetermined gap.

15. The bi-directional optical transceiver module of claim 13, wherein the waveguide substrate is formed of silica.

16. The bi-directional optical transceiver module of claim 13, wherein the waveguide substrate is formed of fluorinated polyimide.

17. The bi-directional optical transceiver module of claim 13, wherein the mounting occurs on an upper surface of the waveguide substrate, the high reflection layer having an inclination of 0.5 or less degrees with respect to a normal line perpendicular to said upper surface.

18. A bi-directional optical transceiver module comprising a substrate for supporting an optical fiber, a light source, a light detector, a reflection layer, a first waveguide, a second waveguide and a third waveguide, each of the waveguides having a source end and a destination end, the destination end of the first waveguide being joined with the source end of the second waveguide to form a first mode coupling region, the destination end of the second waveguide being connected to the optical fiber and being joined with the source end of the third waveguide to form a second mode coupling region, so that a transmission optical signal generated by the light source at the source end of the first waveguide is mode-coupled onto the second waveguide for transmission to the optical fiber and so that a reception optical signal from the optical fiber is mode-coupled onto the third waveguide for transmission to said light detector at the destination end of the third waveguide.

19. The bi-directional optical transceiver module of claim 18, wherein the substrate is formed of silica.

20. The bi-directional optical transceiver module of claim 18, wherein the substrate is formed of fluorinated polyimide.

* * * * *